United States Patent [19]

Austin et al.

[11] Patent Number: 5,737,490

[45] Date of Patent: Apr. 7, 1998

[54] METHOD AND APPARATUS FOR CONSTRUCTING CONTINUOUS PARAMETER FENONIC HIDDEN MARKOV MODELS BY REPLACING PHONETIC MODELS WITH CONTINOUS FENONIC MODELS

[75] Inventors: Stephen Christopher Austin, San Mateo; Peter Vincent de Souza, San Jose, both of Calif.

[73] Assignee: Apple Computer, Inc., Cupertino, Calif.

[21] Appl. No.: 735,049

[22] Filed: Oct. 22, 1996

Related U.S. Application Data

[63] Continuation of Ser. No. 129,954, Sep. 30, 1993, abandoned.

[51] Int. Cl.$^6$ .................................. G01L 5/06; G01L 9/00
[52] U.S. Cl. .................................................. 395/2.65
[58] Field of Search .............................. 395/2.65, 2.64, 395/2.54; 391/2.91–2.95

[56] References Cited

U.S. PATENT DOCUMENTS

| | | | |
|---|---|---|---|
| 4,718,094 | 1/1988 | Bahl et al. | 381/43 |
| 4,819,271 | 4/1989 | Bahl et al. | |
| 4,833,712 | 5/1989 | Bahl et al. | 381/43 |
| 5,031,217 | 7/1991 | Nishimura | 381/43 |
| 5,033,087 | 6/1991 | Bahl et al. | 381/43 |
| 5,199,077 | 3/1993 | Wilcox et al. | 381/43 |
| 5,353,377 | 10/1994 | Kuroda et al. | 395/2.65 |
| 5,502,791 | 3/1996 | Nishimura et al. | 395/2.65 |

OTHER PUBLICATIONS

Bahl et al., "Acoustic Markov Models Used in the Tangora Speech Recognition Sysytem", pp. 498–500, IEEE 1988.

Alex Waibel and Kai–Fu Lee, *Readings in Speech Recognition*; pp. 308–319, 332–339 and 507–514. Morgan Publishers, Inc. 1990.

"A Maximum Likelihood Approach to Continuous Speech Recognition" by Lalit R. Bahl, Frederick Jelinek and Robert Mercer; IEEE Mar., 1983, pp. 308–319.

"Speech recognition with continous–parameter hidden Markov models" by Bahl, et al IEEE, Sep./Dec., 1987, pp. 332–339.

"A Tree–Based Statistical Language Model for Natural Language Speech Recognition" by Bahl, et al; pp. 1001–1008; IEEE Jul. 1989.

"CMU Robust Vocabulary–Independent Speech Recognition System" by Hsiao–Wuen Hon and Kai–Fu Lee; pp. 889–892; IEEE 1991.

"Acoustic Markov Models Used in the Tangora Speech Recogniton System" by Bahl, et al. pp. 497–500; IEEE 1988.

*Primary Examiner*—Allen R. MacDonald
*Assistant Examiner*—Patrick N. Edouard
*Attorney, Agent, or Firm*—Blakely, Sokoloff, Taylor & Zafman

[57] ABSTRACT

A method and apparatus for constructing a hidden Markov model comprised of multiple fenones characterized by their duration and a set of acoustic properties. The present invention provides a sequence of fenones to model a speech event. The sequence may undergo modifications to improve the overall performance of the model.

31 Claims, 14 Drawing Sheets

| time | $t_1$ | $t_2$ | $t_3$ | $t_4$ | ... $t_n$ |
|---|---|---|---|---|---|
| acoustic vectors | $v_1$ | $v_2$ | $v_3$ | $v_4$ | ... "$V_n$" |
| Viterbi Alignment | "T" | "T" | "EH" | "EH" | ... "N" |

RAM

| | |
|---|---|
| Set of Markov Models | 921 |
| Set of Reference Vectors | 922 |
| Set of Updated Reference Vectors | 923 |
| Set of Accumulation Vectors | 924 |
| Set of Counters | 925 |

FIGURE 9

METHOD AND APPARATUS FOR CONSTRUCTING CONTINUOUS PARAMETER FENONIC HIDDEN MARKOV MODELS BY REPLACING PHONETIC MODELS WITH CONTINOUS FENONIC MODELS

This is a continuation of application Ser. No. 08/129,954, filed Sep. 30, 1993, now abandoned.

FIELD OF THE INVENTION

The present invention relates to the field of pattern recognition; particularly, the present invention relates to the field of fenonic hidden Markov models and their construction.

BACKGROUND OF THE INVENTION

In speech recognition, hidden Markov models (HMMs) are often used. When an HMM speech recognition system is built, each word in the recognizable vocabulary is defined as a sequence of sounds, or a fragment of speech, that resemble the pronunciation of the word. A Markov model for each fragment of speech is created. The Markov models for each of the sounds are then concatenated together to form a sequence of Markov models that depict an acoustical definition of the word in the vocabulary. For example, in FIG. 1, a phonetic word 100 for the word "TEN" is shown as a sequence of three phonetic Markov models, 101–103. One of the phonetic Markov models represents the phonetic element "T" (101), having two transition arcs 101A and 101B. A second of the phonetic Markov models represents the phonetic element "EH", shown as model 102 having transition arcs 102A and 102B. The third of the phonetic Markov models 103 represents the phonetic element "N" having transition arcs 103A and 103B.

Each of the three Markov models shown in FIG. 1 have a beginning state and an ending state. The "T" model 101 begins in state 104 and ends in state 105. The "EH" model 102 begins in the state 105 and ends in state 106. The "N" model 103 begins in state 106 and ends in state 107. Although not shown, each of the models actually has states between their respective beginning and ending states in the same manner as arc 101A is shown coupling states 104 and 105. Multiple arcs extend and connect the states. During recognition, an utterance is compared with the sequence of phonetic Markov models, starting from the leftmost state, such as state 104, and progressing according to the arrows through the intermediate states to the rightmost state, such as state 107, where the model 100 terminates in a manner well-known in the art. The transition time from the leftmost state 104 to the rightmost state 107 reflects the duration of the word. Therefore, to transition from the leftmost state 104 to the rightmost state 107, time must be spent in the "T" state, the "EH" state and the "N" state to result in a conclusion that the utterance is the word "TEN". Thus, a hidden Markov model for a word is comprised of a sequence of models corresponding to the different sounds made during the pronunciation of the word.

In order to build a Markov model, such as described in FIG. 1, a pronunciation dictionary is often used to indicate the component sounds. Various dictionaries exist and may be used. The source of information in these dictionaries is usually a phonetician. The components sounds attributed to a word as depicted in the dictionary are based on the expertise and senses of the phonetician. Since phoneticians are human, pronunciations may differ from one phonetician to the next. Also, another limitation with the case of dictionaries is that a particular pronunciation dictionary may not be correct. Errors are usually due to descriptions in the pronunciation of a word being defined in units that are too crude to grasp to the complexity of the sound. For instance, with respect to the word "TEN", the pronunciation dictionary indicates that the word "TEN" consists of three sounds, 'T', 'EH' and 'N'. Upon analysis of the acoustics, it may be difficult to actually differentiate three separate components to the word "TEN". Further, the phonetic components of a word may be different depending on their context (i.e., the surrounding phonetic models). For instance, the "T" in one word does not necessary resemble the "T" in another word. This is due to several acoustic distinctions.

One solution to these inadequacies of pronunciation dictionaries is to obtain actual pronunciation data by having a group of people pronounce a particular word or speech fragments multiple times during a training stage to obtain actual acoustic data. This approach is often referred to as a data driven approach, rather than a knowledge-based approach. From the acoustic data received, a phonetic model is built, usually using software. A dictionary is never used. Because actual speech data is used, the models created more accurately describe each word in the vocabulary.

Problems exist when using a purely data-driven approach. One problem with a purely data-driven approach is that common portions of similar words are often lost or unused when constructing a model. For instance, if the words "six" and "sixty" are both pronounced by a group of individuals during a training stage, in a purely data-driven approach, the models eventually created to model both words may not have the same models associated with the common portion "six" found in both words. It is desirable to construct hidden Markov models for words in which models for common portions of multiple words are the same. Using a pronunciation dictionary to produce the models automatically provides the connection because common portions are all attributed as having the same pronunciation definition. However, using a dictionary does not always provide accurate acoustics. Therefore, it is desirable to construct hidden Markov models that provide accurate acoustics, yet also result in substantially similar models for portions of words that are common between multiple words.

One proposed solution to the phonetician-dependence problem is the use of a Markov model speech recognition system having an acoustic processor for converting an acoustic input into a string of labels. These labels are selected from a group, or alphabet, of labels, in which each label corresponds to a defined cluster of acoustic vectors. For each label, a Markov model exists. One type of Markov model relates to labels rather than phonetic elements. These are referred to as fenonic Markov models in which a fenonic Markov model corresponds to each label. In speech recognition systems based on fenonic Markov models, each word is represented by a sequence of fenonic Markov models in the form of a word baseform. For a string of labels generated by an acoustic processor in response to a speech utterance, the fenonic Markov model sequence for each word is matched against the speech utterance to determine the word likelihood.

In the prior art, discrete parameter fenones are constructed such that they are characterized by multinomial distributions. Using these fenones, a fenone sequence is sought that maximizes the joint probability of the acoustic labels obtained by vector quantizing a set of utterances. Such a system is shown in U.S. Pat. No. 4,819,271, entitled "Constructing Markov Model Word Baseforms From Multiple Utterances By Concatenating Model Sequences For Word Segments", Bahl et al.

The present invention provides a method and apparatus for constructing hidden Markov models in such a way as to blend the purely data driven approach with the knowledge-based or dictionary approach. The process of the present invention builds the models initially using models derived from a dictionary pronunciation and then modifies those models with actual acoustic information from training data to produce models that better reflect the actual pronunciations of words.

SUMMARY OF THE INVENTION

A method and apparatus for constructing hidden Markov models for modeling speech units are described. The present invention provides a method and apparatus for creating multiple fenones. Each of the fenones is characterized by their duration and a set of acoustic properties. In one embodiment, the duration is defined by a set of transition probabilities, each assigned to one of the arcs in a fenone. In one embodiment, the set of acoustic properties include a set of multivariate Gaussian distributions.

The present invention also provides a method and apparatus for creating a fenonic model using the sequence of phonetic models that represents a given speech event. In the present invention, each of the phonetic models in the sequence is replaced by one or more of the fenones. In this manner, the present invention constructs a fenonic hidden Markov model characterizing the speech event.

The present invention also provides a method and apparatus for improving the fenonic model. In the present invention, individual fenones in the fenonic model may be replaced with other fenones, including multiple fenones. Also fenones may be removed from the model. In this manner, the fenonic model may be improved.

BRIEF DESCRIPTION OF DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 4 illustrates a timing diagram of an utterance.

FIG. 9 is a block diagram of the random access memory of FIG. 3B.

DETAILED DESCRIPTION OF THE INVENTION

Figure 1:
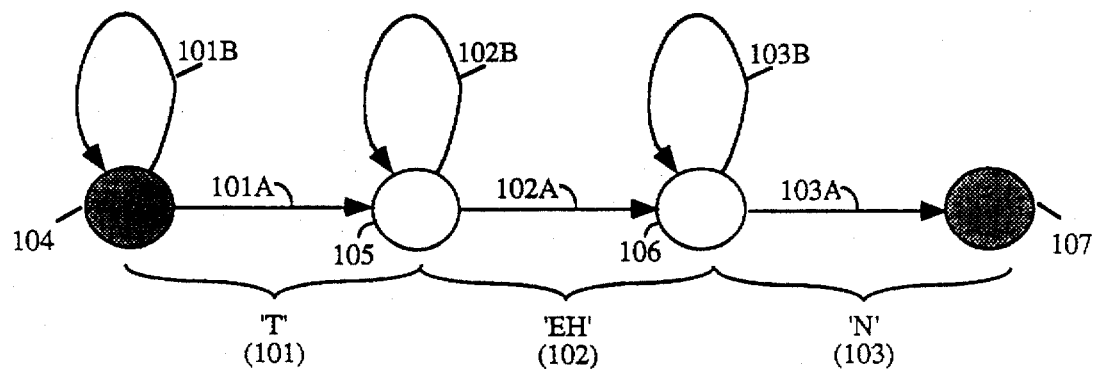
FIG. 1 illustrates an example of a hidden Markov model for the word "TEN".

A method and apparatus for constructing hidden Markov models is described. In the following detailed description of the present invention numerous specific details are set forth, such as specific number of arcs, specific transition probabilities, specific parameters, etc., in order to provide a thorough understanding of the present invention. However, it will be obvious to one skilled in the art that the present invention may be practiced without these specific details. In other instances, well-known structures and devices are shown in block diagram form, rather than in detail, in order to avoid unnecessarily obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

One embodiment of the preferred embodiment of the present invention is a speech recognition system. However, it should be realized that the present invention is not limited to such systems and applies equally to other pattern recognition systems, such as handwriting recognition systems in which reference and observed vectors would relate to handwriting patterns and data as input from a stylus and tablet, for example.

OVERVIEW OF THE PRESENT INVENTION

The present invention provides a method and apparatus for constructing continuous parameter fenonic hidden Markov models (HMMs). In the present invention, the continuous parameter fenonic HMMs are created using phonetic models of speech recognition. The present invention transforms phonetic models into fenonic models, such that an alphabet of fenones is constructed. Each of the fenones is an elementary HMM representing a brief acoustic event. In the present invention, each fenone is characterized by its duration and its acoustic properties. In one embodiment, the duration of each fenone is characterized by a set of transition probabilities. The acoustic properties for each fenone may be defined by continuous distributions, such as a set of multivariate Gaussian distributions. Given one or more instances of à speech event, such as a word or phone, the present invention constructs an HMM for that event in the form of a sequence of fenones.

THE PROCESS OF THE PRESENT INVENTION

Figure 2:
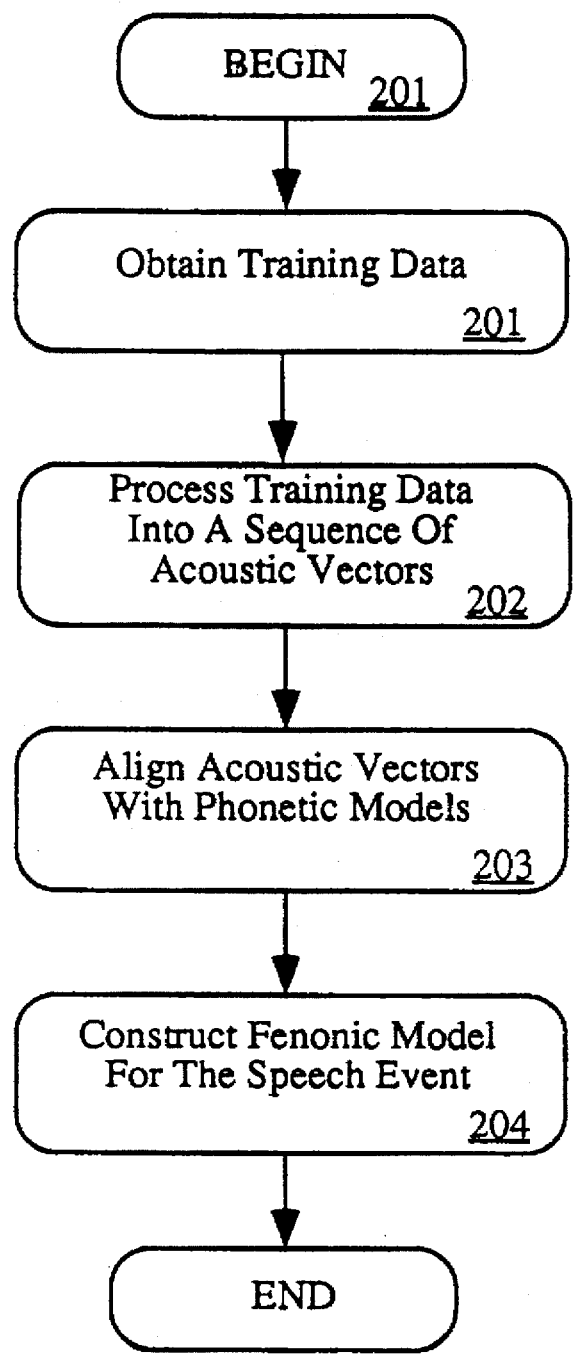
FIG. 2 is a flowchart of the process of the present invention.

FIG. 2 illustrates a flow chart of the present invention. Referring to FIG. 2, the present invention initially obtains training data (processing block 201). The training data is then signal processed into a sequence of acoustic vectors (processing block 202). The acoustic vectors derived from the training data are then aligned with linear phonetic Markov models, such as allophonic models based on triphones (processing block 203). It is important to note that in the present invention "linear" in conjunction with phonetic models refers to the fact that there are no backward-pointing arcs in the models and all paths through a given phonetic model visit the same sequence of distinct arcs, with the exception of those arcs that may be bypassed or skipped. Given a speech event that occurs one or more times in the training data, the present invention constructs a continuous parameter fenonic HMM from the phonetic model for that event (processing block 204). In the present invention, speech events may include phones, syllables, words or any other unit or speech.

Figure 3A:
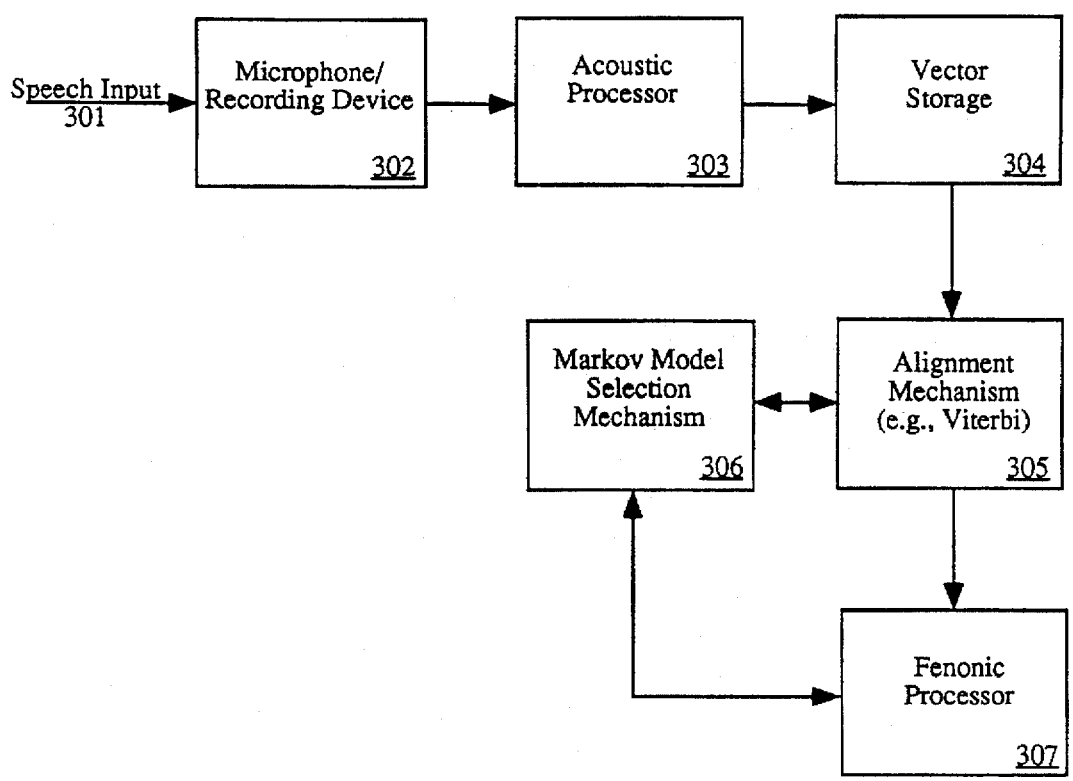
FIG. 3A is a block diagram of the vocabulary creation system of the present invention.

FIG. 3A illustrates one embodiment of a system 300 of the present invention for implementing the steps in FIG. 2. Referring to FIG. 3A, a microphone/recording device 302 is coupled to receive speech input 301. Acoustic processor 303 is coupled to receive the recorded speech input 301 from microphone/recording device 302. Acoustic processor 303 produces multiple acoustic vectors in response to receiving the recorded speech input 301. These vectors are stored in vector storage 304. Alignment mechanism 305 is coupled to receive the acoustic vectors and aligns the vectors with the phonetic Markov models received from Markov model selection mechanism 306. The results of the alignment operation are received by fenonic processor 307 which constructs the fenonic HMMs using models received from Markov model selection mechanism 306.

It should be noted that system 300 may comprise a computer system, wherein the components shown are represented as one of more integrated. circuits. In another embodiment, some of the components shown are implemented in software for use with a computer system having a memory, processor and a computer system bus operably coupled. Also, acoustic processor 303 may provide one or more of the other functions shown and described in conjunction with the blocks in FIG. 3. For instance, acoustic processor 303 and fenonic processor 307 may be the same processor.

Figure 3B:
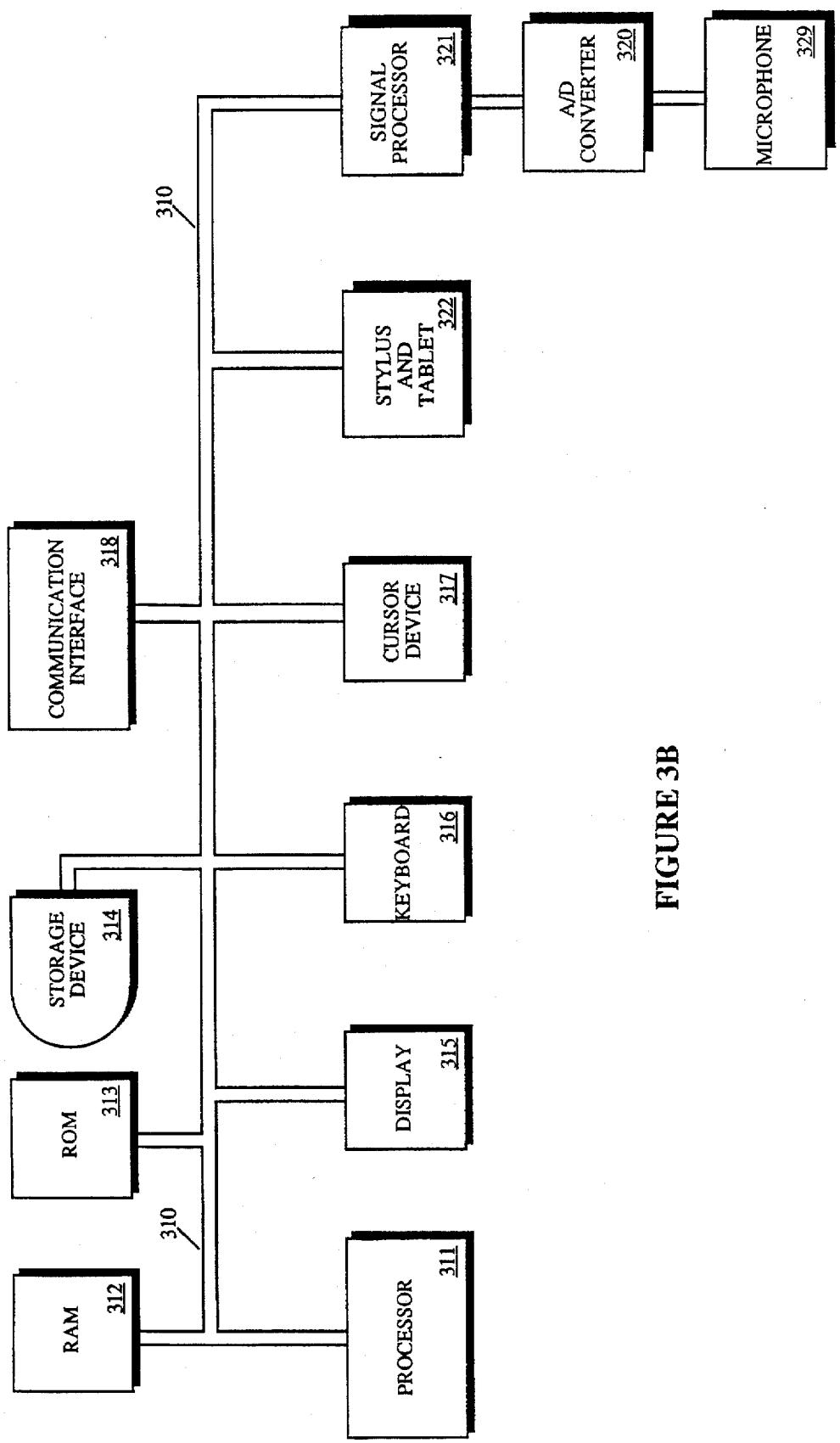
FIG. 3B is a block diagram of the computer system of the present invention.

In general, computer systems used in one embodiment of the present invention to perform pattern recognition including speech recognition, as illustrated in block diagram format in FIG. 3B, comprise a bus 300 for communicating information, a central processor 311 coupled with the bus for processing information and instructions, a random access memory 312 coupled with the bus 310 for storing information and instructions for the central processor 311, a read only memory 313 coupled with the bus 310 for storing static information and instructions for the processor 311, a data storage device 314 such as a magnetic disk and disk drive coupled with the bus 310 for storing information (such as audio or voice data) and instructions, a display device 315 coupled to the bus 310 for displaying information to the computer user, an alphanumeric input device 316 including alphanumeric and function keys coupled to the bus 310 for communicating information and command selections to the central processor 311, a cursor control device 317 coupled to the bus for communicating user input information and command selections to the central processor 311, a signal generating device (communication interface) 318 coupled to the bus 310 for communicating command selections to the processor 311, a standard microphone 319 to input audio or voice data to be processed and stored by the computer system, an analog-to-digital converter 320 coupled to the microphone 319 and the bus 310 to transform analog voice data from the microphone 319 to digital form which can be processed by the computer system, and a stylus and tablet 322 coupled to the bus 310 for communicating digital information representative of handwriting to the processor 311.

The present invention may also optionally include a signal processor 321 coupled to the analog to digital converter 320 and the bus 310 for preliminary processing of the voice data before it is communicated to the processor 311 and the rest of the system over bus 310. The signal generation device 318 also includes, as an output, a standard speaker for realizing the output audio from input signals from the computer system. Block 318 also includes well known audio processing hardware to transform digital audio data to audio signals for output to the speaker, thus creating an audible output.

The display device 315 of FIG. 3B utilized with the computer system and the present invention may be a liquid crystal device, cathode ray tube, or other display device suitable for creating graphic images and alphanumeric characters recognizable to the user. The cursor control device 317 allows the computer user to dynamically signal the two dimensional movement of a visible symbol (pointer) on a display screen of the display device 315. Many implementations of the cursor control device are known in the art including a trackball, mouse, joystick or special keys on the alphanumeric input device 316 capable of signaling movement of a given direction or manner of displacement. It is to be appreciated that the cursor means 317 also may be directed and/or activated via input from the keyboard using special keys and key sequence commands. Alternatively, the cursor may be directed and/or activated via input from a number of specially adapted cursor directing devices, including those uniquely developed for the disabled. The input cursor directing device or push button may consist of any of those described above and specifically is not limited to the mouse cursor device.

Referring back to FIG. 3A, in the present invention, the training data is obtained by recording words pronounced by numerous individuals. As an individual speaks, the signal received by the recording device, such as recording device 302, is analyzed. In one embodiment, the speech signals are analyzed every 100th of a second. In other words, every 1/100th of a second, signal processing is performed on the speech input signals 301 received by receiving device 302 during the last 1/100 second. The present invention is not limited to processing at time intervals of 1/100 of a second and may utilize other time interval lengths. The analysis is performed by acoustic processor 303. The results of the signal processing is a vector of acoustic parameters that describe the sound.

Many signal processing mechanisms and/or algorithms may be used to produce the acoustic vectors. Examples of acoustic vectors well-known in the art that result from these signal processing mechanisms and methods include power spectrum, cepstral parameters, LPC coefficients, vocal tract parameters and derivations thereof. Each vector is then correlated against the original phonetic HMM. In one embodiment, this is accomplished by using Viterbi alignment in a manner well-known in the art. Viterbi alignment is an algorithm that is well-known in the art in which the acoustic vectors are aligned with the phonetic model. In other words, Viterbi alignment indicates which acoustic vector is associated with each state or arc in the phonetic HMM. The alignment also permits the actual acoustics of a specific portion of speech to be identified by evaluating the vectors aligned with that portion of the HMM.

FIG. 4 illustrates one example of the processing of the present invention. Referring to FIG. 4, a timing diagram for the word "TEN" is shown for specific time intervals $t_1, t_2, t_3, \ldots t_n$. In one embodiment, these intervals are spaced 1/100 second apart. The vectors processed for the time interval are shown as $v_1, v_2, v_3, \ldots v_n$. The results of the Viterbi alignment are shown where the Markov model for the sound "T" is aligned with acoustic vectors $v_1$ and $v_2$. The Markov model for the sound "EH" is aligned with acoustic vectors $v_3$ and $v_4$. At the last time increment $t_n$, the Markov model for the sound "N" is aligned with acoustic vector $v_n$.

Figure 5:
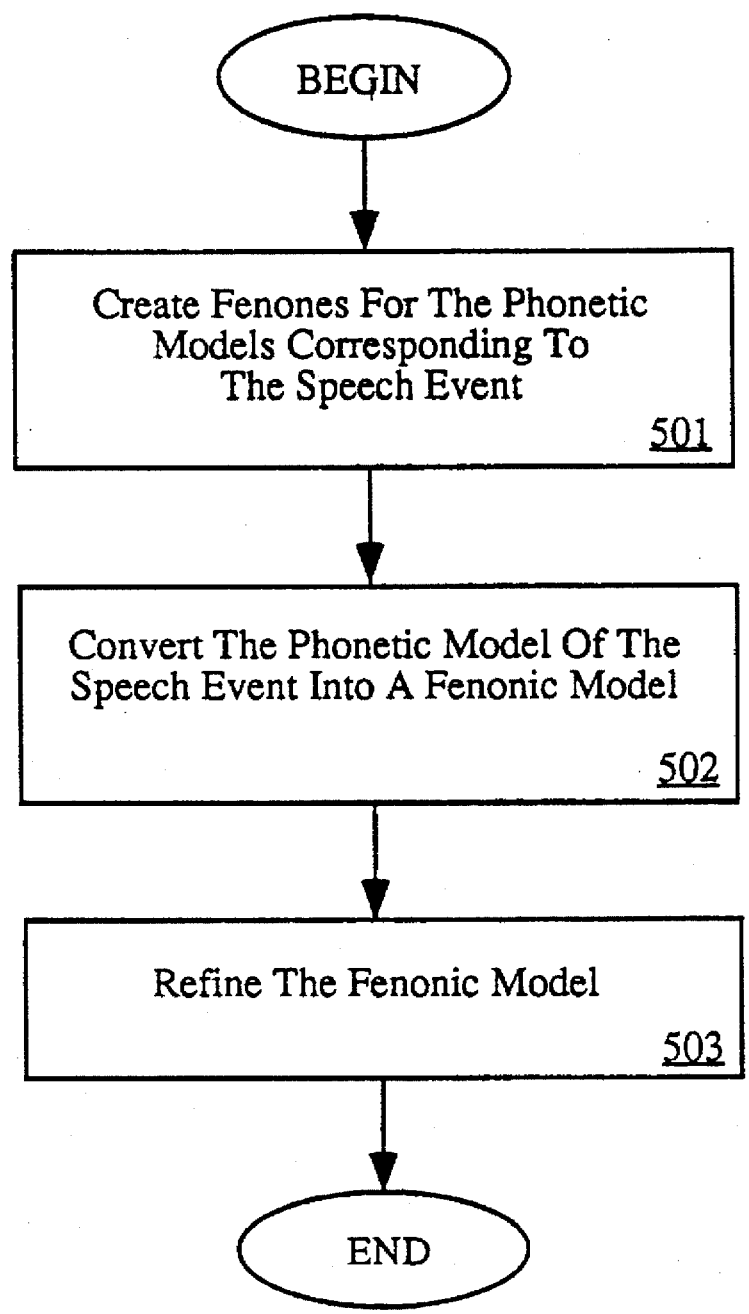
FIG. 5 is a flowchart depicting the process of creating fenones according to the present invention.

FIG. 5 illustrates one embodiment of the process for constructing continuous parameter fenonic HMMs according to the present invention. Referring to FIG. 5, the process for building continuous parameter fenonic HMMs begins by creating fenones for the Markov model (processing block 501). These fenones express the Markov model in operable units. This allows these fenones to be used as building blocks. Next, the phonetic model of the speech event is converted from a model based on the dictionary defined pronunciation into a fenonic model (processing block 502). In other words, the model defined according to a dictionary pronunciation is modified using the fenones created at processing block 501. Then, the fenonic model is refined to produce a better model for the speech art (processing block 503). In the present invention, this represents changing, replacing or removing fenones in the initial fenonic model. The results of such modifications to the fenonic model may result in the model being expanded, condensed or remaining the same length.

It should be noted that the fenones utilized in the present invention are described in connection with a continuous parameter process, as opposed to the discrete parameter fenones of the prior art that are associated with labels. In the present invention, the fenones are associated with acoustic vectors, not labels.

Figure 6:
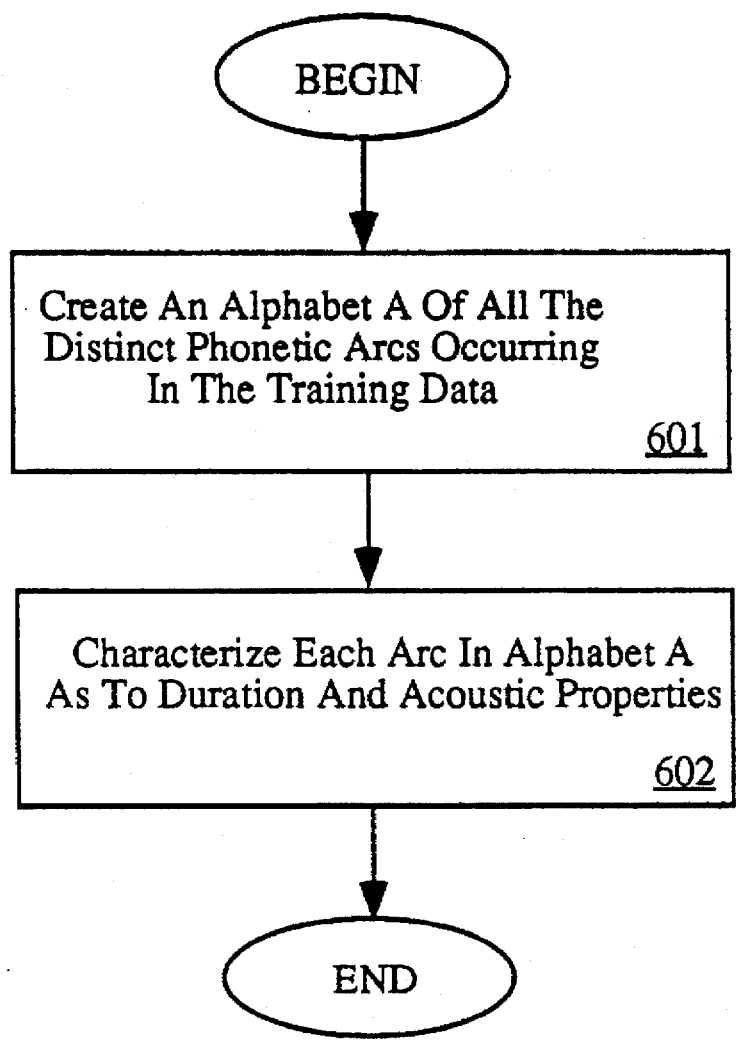
FIG. 6 is a flowchart of the characterization process of the present invention.

Once training data has been obtained through such steps as recording speech, performing signal processing to obtain acoustic vectors and performing Viterbi alignment, fenones are created for the HMM. FIG. 6 illustrates a flow chart of one embodiment of the process for creating fenones for the HMM. Referring to FIG. 6, initially an alphabet of all of the distinct phonetic arcs occurring in the training data is created (processing block 601). Then each fenone in the alphabet of distinct fenones is characterized with respect to duration and acoustic properties (processing block 602).

In a typical system, a number of distinct arcs can number from anywhere between 200 to 20,000 depending on the sophistication of the acoustic model. The present invention produces a fenone for each of these distinct arcs. Each of the fenones models a tiny fragment of speech. Each fenone is defined in one-to-one correspondence with the arcs.

In one embodiment, all of the fenones have the same topology. However, the fenones may have different topologies. Each arc in a fenone is acoustically identical. The actual number of arcs in a fenone may be more than two. For instance, there may be four or five arcs in a fenone.

After a fenone has been defined for each distinct arc, the present invention characterizes each fenone by duration and its acoustic properties. The duration is described according to the number of frames for which the fenone is expected to endure, i.e. how long the fenone is to last. A probability is associated with every arc in a fenone. The probability indicates the likelihood that the arc will be taken at any given instance in time. Therefore, in the present invention, transition probabilities are assigned to each arc in each fenone. The cumulative total for all transition probabilities between successive states in a fenone is 100 percent.

The relative size of the probabilities chosen for each arc in a fenone affects its duration. If a high transition probability is associated with a self-looping arc in a fenone, the duration of the fenone will be long because the self-looping arc is taken a high percentage of the time. On the other hand, if a high transition probability is associated with an arc that travels between two distinct states, then the fenone will have a short duration because there is a high probability that the arc will be taken.

In the present invention, the transition probabilities may initially be chosen arbitrarily. For each of the arcs, any transition probability greater than 0.05 may be used. The transition probabilities for all arcs leaving a particular state should cumulate to 100 percent probability. In one embodiment, all of the arcs may be assigned the same transition probability. Since a fenone should endure for one frame on average, the arc representing the transition from the beginning state of the fenone to its ending state may be assigned a higher probability, thereby indicating the path that is most likely to be taken.

It should be noted that the transition probabilities do not have to be actual probabilities. In the present invention, once the fenonic model has been created, the actual transition probabilities may be ascertained. If this is desired, the process of the present invention may be repeated using the real transition probabilities. However, at this stage in constructing the fenonic model, any reasonable numbers may be used for the transition probabilities for the arcs in the fenone.

Next, the acoustic properties of each of the fenones must be ascertained. In the prior art, the acoustic properties of fenones are described by multinomial distribution, wherein the types of acoustic labels for each fenone that are expected to be received by the signal processor are derived. In the present invention, a mixture of Gaussian distributions is associated with each fenone. Each of the fenones models p-dimensional acoustic vectors. Therefore, the fenonic distribution is a mixture of p-dimensional Gaussian distributions. In some embodiments, p may be between 8 to 50, depending on type of signal processor being used. The Gaussian distribution indicates the average value of the vectors and how the particular vector varies about the average. A single Gaussian distribution may be used to describe the average value and the variation about the average value. However, because acoustics are so complicated, a single Gaussian does not model fenones well. Therefore, two or more Gaussians may be more representative of the actual acoustics.

In the present invention, the Gaussian distributions are obtained from the original arcs in the original phonetic models. This is due to the fact that in the present invention, the fenones are defined in a 1-to-1 correspondence with the arcs in alphabet A. Therefore, by examining the Gaussian model for an arc in the original model, the corresponding fenone for a particular arc inherits the acoustic properties as its own. In actuality, the Viterbi alignment depicts which frames correspond to a particular arc. Using the Viterbi alignment, all frames associated with a specific arc are identified.

Figure 7:
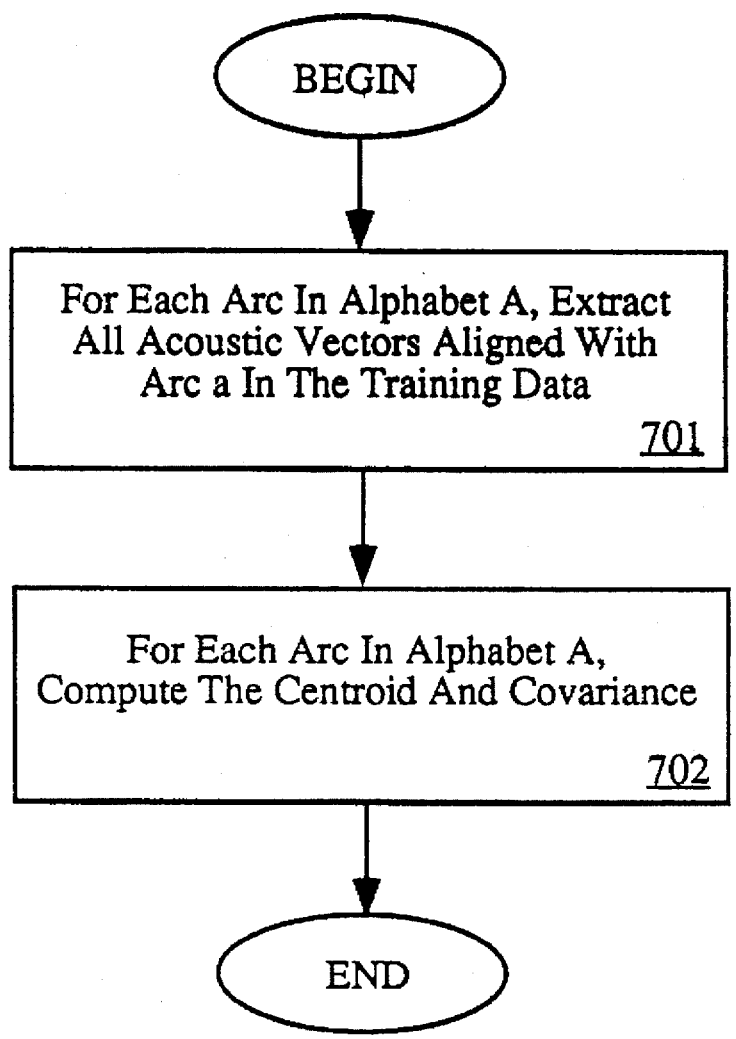
FIG. 7 is a flow chart of the process to define the acoustic properties of each of the fenones according to the present invention.
Figure 8A:
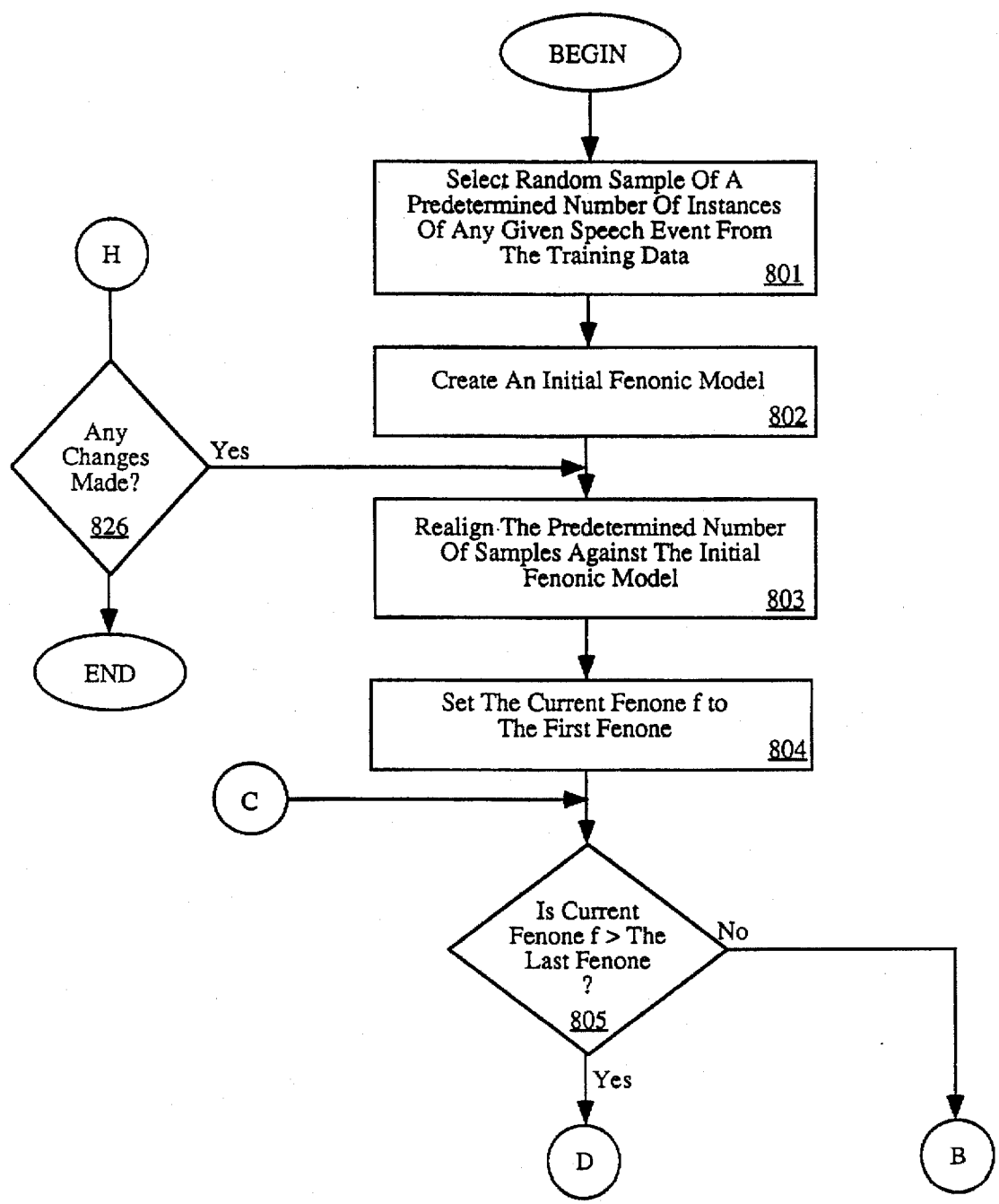
FIGS. 8A–D are flowcharts depicting the process of the present invention for constructing a fenonic Markov model from an alphabet of fenones.
Figure 8B:
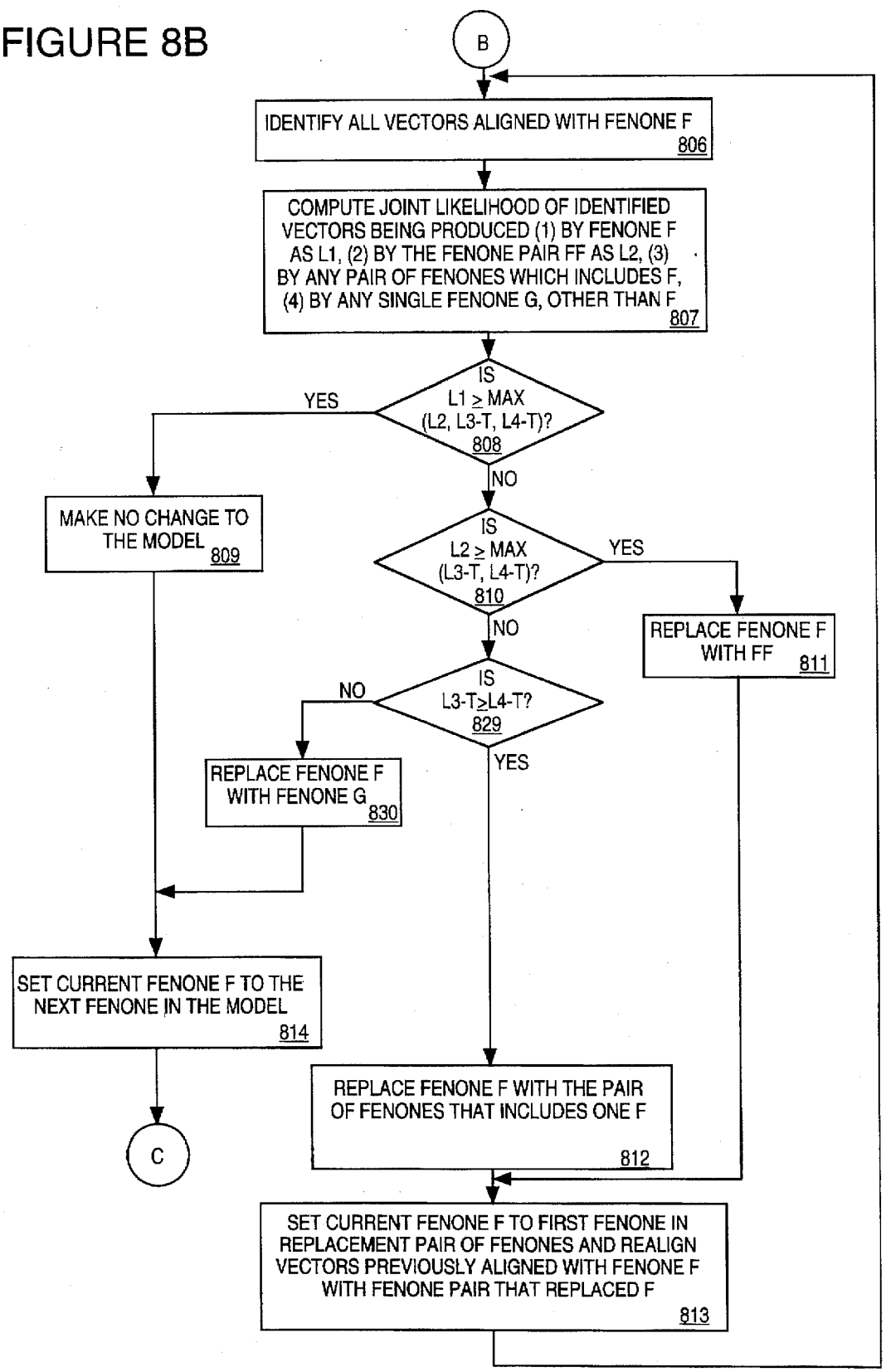
Figure 8C:
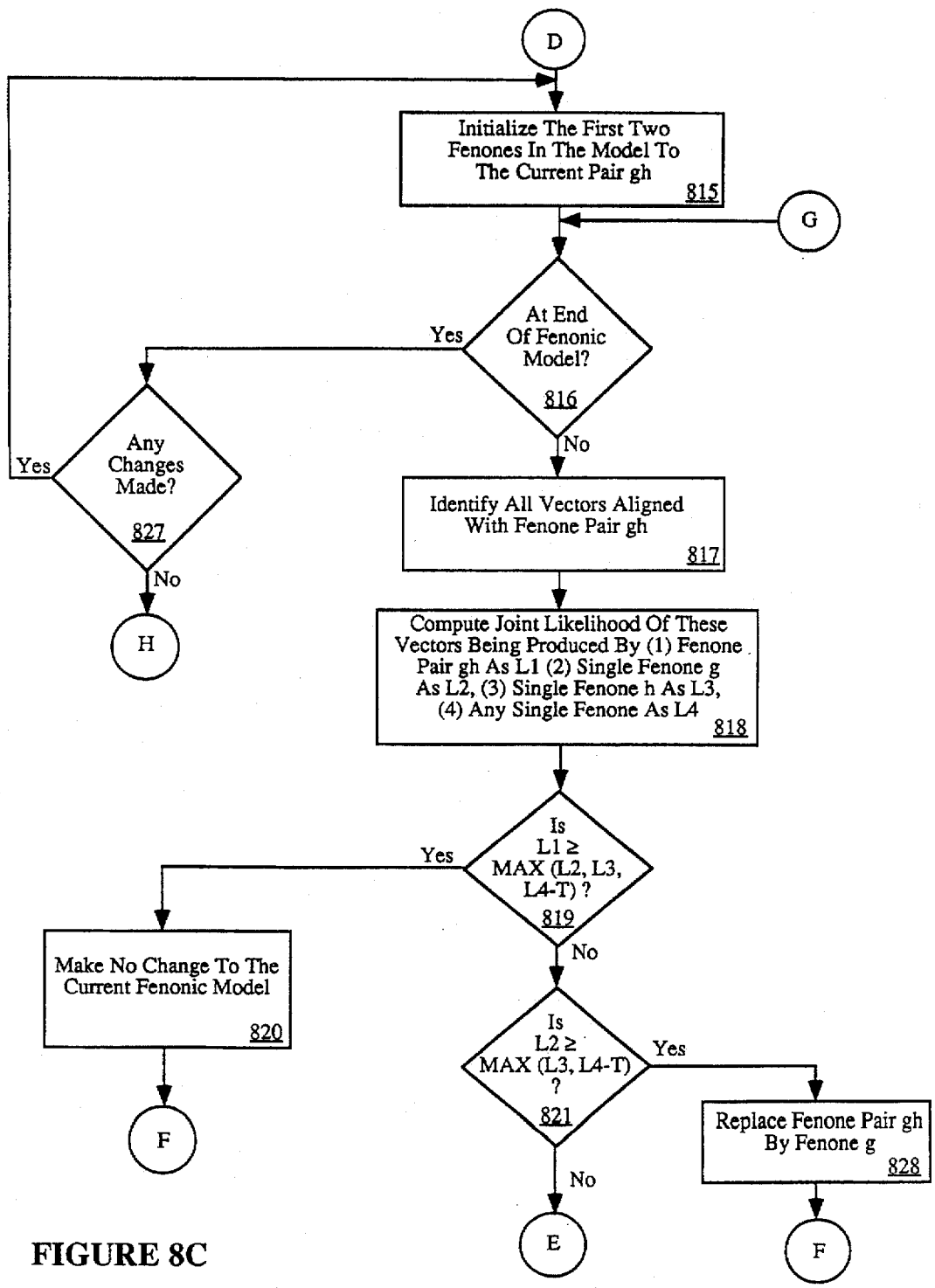
Figure 8D:
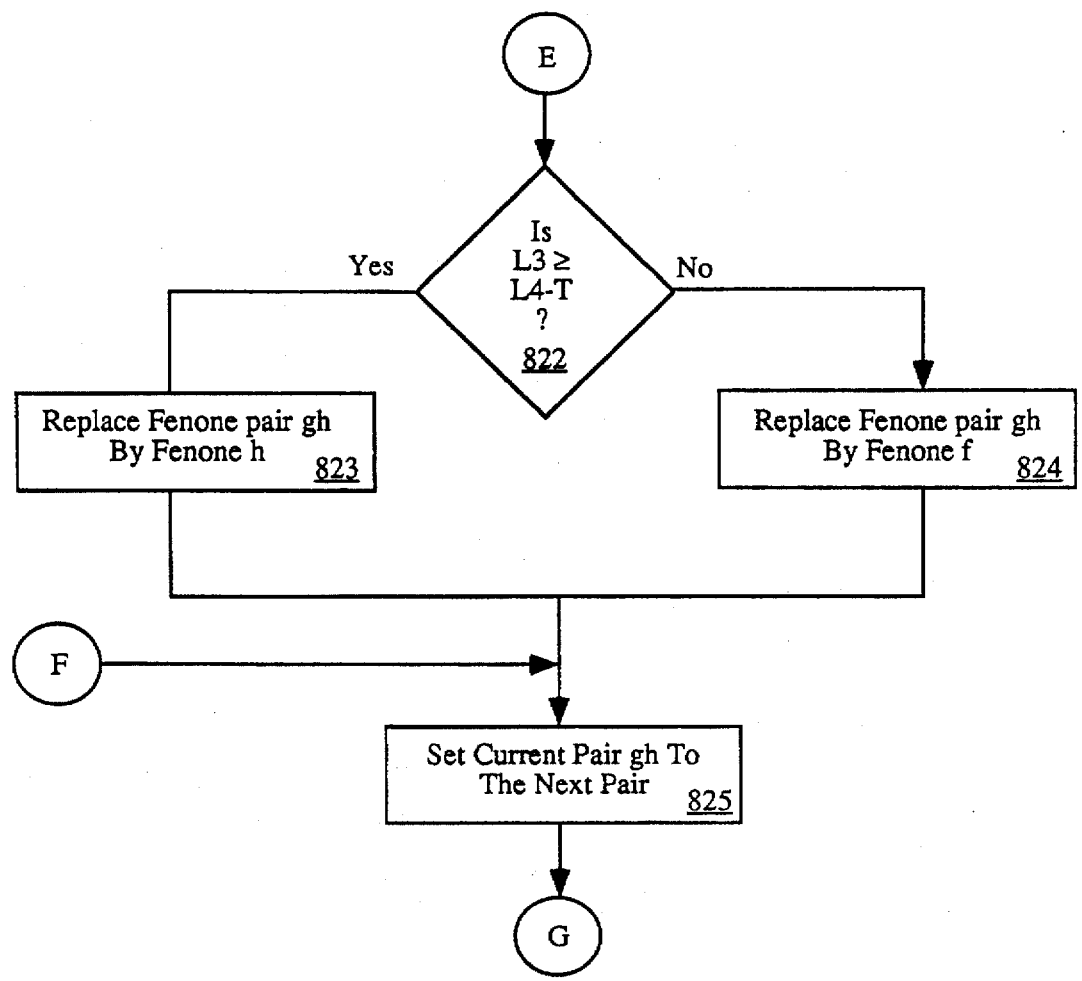

FIG. 7 illustrates one embodiment of the process of the present invention for obtaining the acoustic properties for each of the fenones. Referring to FIG. 7, to obtain the acoustic properties for a fenone, all of the acoustic vectors aligned with the corresponding phonetic arc are extracted from the training data (processing block 701). These acoustic vectors are then clustered into n clusters, where n is a predetermined number (processing block 702). In one embodiment, these acoustic vectors are created using k-means clustering.

The value of n indicates the number of Gaussians and may be in the range of 3000/N to 10000/N, where N is the number of distinct phonetic arcs occurring in the training data. In k-means clustering, all of the extracted vectors are allocated into n groups.

Then the centroid and covariance matrix for each of the n clusters is computed (processing block 702). The centroid corresponds to the average value of the vectors in the cluster, while the covariance matrix represents the variance from the average value. For computational efficiency, diagonal covariance matrices are usually preferred to full covariance matrices. The mixture of Gaussian distributions are then determined by computing the average value and variance (or standard deviation) for each of the n groups. Thus, each Gaussian distribution comprises a mean vector and a covariance matrix. Therefore, if a mean vector and covariance matrix is calculated for each of the n groups, then there will be n mean vectors and n covariance matrices, all of which represent the mixture of Gaussian distributions.

Therefore, to reiterate, all that is required to produce the mixture of Gaussians is a Viterbi alignment, k-means clustering and then a computation of the mean and covariance matrix for each of the clusters.

It should be noted that if the acoustic vectors elements are approximately uncorrelated, such as the case with LDA or PC eigenvectors, then Euclidean distance may be used to cluster the vectors. Alternatively, Gaussian log likelihood may be used.

After the Gaussian distributions have been completed, an alphabet of fenones is defined in a one-to-one correspondence with the arcs in alphabet A of distinct phonetic arcs occurring in the training data. Each fenone is represented by an elementary Markov model which can have any conventional topology, such as any described by L. R. Bahl et al., in "Acoustic Markov models used in the Tangora speech recognition system," Proc. ICASSP 1988, pages 497–500. The output distribution associated with each fenone is a mixture of Gaussian distributions specified by the centroids and covariance matrices obtained form the corresponding arc in the alphabet of distinct phonetic arcs in the training data. Furthermore, each arc in the fenone is assigned a transition probability.

CONSTRUCTING A FENONIC MODEL

Once fenones have been created, a fenonic model for any given speech event can be constructed. The fenonic model for the given speech event is created using the phonetic model of the event. The present invention provides a process to improve the phonetic model of the speech event using the fenones created above. This improvement process is performed on an "arc-by-arc" basis. The process is illustrated in a flow chart in FIGS. 8A–D.

The present invention selects a random sample of a predetermined number K of instances of any given speech event from the training data (processing block 801). The predetermined number K may be any reasonable number. For example, 50–100 instances of the speech event may be used.

Next, an initial fenone model is created (processing block 802). In the present invention, the initial model is created using the phonetic alignment. Each distinct arc in the original phonetic sequence of the model of the speech event is replaced by a fenone. The replacement is performed according to which fenone maximizes the joint likelihood of all the vectors aligned with each particular phonetic arc in the samples of the predetermined instances. The resulting sequence of fenones comprises the initial fenonic model for the speech event.

The indication of which fenone best models a particular sample of vectors may be obtained from the Viterbi alignment. The Viterbi alignment indicates not only the alignment between the sample data and the model, but also scores how well the data matches the model. The forward pass algorithm may be used to give a score to every fenone in the set of fenones that has been created. It should be noted that most often the fenone chosen is the one corresponding to the original phonetic arc. Thus, for the most part, the changes made are subtle.

Specifically, using the instances of the speech event, Viterbi alignment identifies which acoustic vectors correspond to which phonetic arcs in the original Markov model. It should be noted that some arcs may have one or more vectors associated with them, while other arcs may have none. Once all of the vectors have been assigned to their respective arcs, a fenone is selected for each arc from the alphabet of fenones which best models all of the vectors aligned with that arc. In other words, an acoustic match occurs, such that the fenone that has the highest likelihood of producing all of the vectors is chosen to replace the arc in the model.

Once an initial fenonic model for the speech event has been created, all of the predetermined number K samples are realigned against the fenonic model (processing block 803). Now the model may be modified to further improve the acoustics of the fenonic model. Changes to the model may be needed. One possible reason for refinement changes is that the current fenonic model includes the same alignment as the original phonetic model. The dictionary indicated the phonetic pronunciation and indirectly the number of arcs that existed in the model. In the previous steps, all of the vectors corresponding to a particular arc were accounted for by one fenone, and the fenones replaced each of those arcs on a one-to-one basis. There may be instances in which it is desirable to separate certain of those fenones into two fenones. Thus, the present invention provides a mechanism by which the alignment inherited from the original phonetic model may be changed. In doing so, the present invention may eliminate any dependence on the phonetic models provided from the dictionary pronunciations.

After realignment (processing block 803), the operations of substitution and insertion are undertaken by the present invention. The current fenone variable f is initialized to the first fenone (processing block 804). Then a test determines if the current fenone is greater than the last fenone in the current fenonic model (processing block 805). In other words, the present invention tests whether the end of the fenonic model has been reached. If the end of the fenonic model has not been reached, then processing continues at processing block 806. On the other hand, if the end of the fenonic model has been reached, then processing continues at processing block 815.

At processing block 806, all of the vectors aligned with the current fenone f are identified. Then the present invention computes the joint likelihood of these vectors being produced by (1) the single fenone f, (2) the pair of fenones ff, (3) or any pair of fenones which includes f, (4) any single fenone g, other than f (processing block 807). The pair of fenones may be a pair of fenones in which the fenone f is the first fenone in the pair or is the second fenone in the pair. The resulting log likelihood of these vectors being produced by the single fenone f is denoted L1. The resulting log likelihood of these vectors being produced by the pair of fenones ff is denoted L2. The resulting log likelihood of these vectors being produced by the pair of fenones gh is denoted L3. The resulting log likelihood of these vectors being produced by the fenone g if denoted L4.

After computing the joint likelihtheoods (processing block 807), a test determines if the likelihood L1 is greater than or equal to the greater of the likelihoods L2, L3-T or L4-T (processing block 808). It should be noted that T represents a predetermined threshold. The threshold T insures that changes are only made when the improvement or benefit received is of a substantial nature. This prevents small changes in performance from always causing substitutions to be made. In the present invention, the threshold T is set equal to the number of samples of the event multiplied by some threshold t. The threshold t may be any one a number of reasonable numbers. For instance, in one embodiment, threshold t ranges from 0–3. As threshold t is increased, the variety of fenones present in the model is progressively limited. That is, as threshold t increases, runs of identical fenones become more likely. At threshold t equal to zero, the maximum likelihood estimate of the model is obtained, runs are rare, and recognition performance is generally poorer.

If the likelihood L1 is greater than or equal to the greater of the likelihoods L2, L3-T or L4-T, then processing continues at processing block 809 and the fenone is not changed. The current fenone is then set to the next fenone in the sequence of fenones in the fenonic model (processing block 814) and processing continues at processing block 805 for the next fenone If the likelihood L1 is not greater than or equal to the greater of the likelihoods L2, L3-T or L4-T, then processing continues at processing block 810. At processing block 810, a test determines whether the likelihood L2 is greater than or equal to the greater of L3-T or L4-T. If so, the fenone f is replaced by the fenone pair ff (processing block 811) and processing continues at processing block 813). If the likelihood L2 is not greater than or equal to the greater of L3-T or L4-T, then processing continues at processing block 829, where a test determines whether the likelihood L3-T is greater than or equal to the likelihood L4-T (e.g., whether L3≧L4 where T is the same). If the likelihood L3-T is greater than or equal to the likelihood L4-T, then the fenone f is replaced with the fenone pair that includes a fenone f (processing block 812) and processing continues at processing block 813. If the likelihood L3-T is not greater than or equal to the likelihood L4-T, then the fenone f is replaced with fenone g (processing block 830) and processing continues at processing block 814).

At processing block 813, the current fenone f is set to the first of the fenones in the pair of fenones that has just been inserted into the fenonic model as a replacement for the single fenone f. In other words, the current fenone f is set to the first fenone f in the replacement fenone pair ff or the first fenone in the replacement pair of fenones that includes one fenone f. Also at processing block 813, the vectors previously aligned with fenone f are realigned (using Viterbi alignment) with the fenones that replaced fenone f. Processing then continues at processing block 806. This essentially repeats the insertion/expansion portion of the fenonic model construction process of the present invention for the newly inserted pair of fenones. If upon performing the comparison with respect to the likelihoods, one or both of the fenones may be expanded themselves; this causes the process of the present invention to be repeated again. The expansion continues until there is no longer any expansion. As currently implemented, the present invention does not continue onto the next fenone in the sequence of fenones in the fenonic model until a fenone is completely finished expanding. The present invention is not limited to such an implementation. In another embodiment, the present invention may perform substitution and insertion one time on each fenone in the fenonic model, and once finished, then repeat the process again and again until no more expansion occurs.

Once the end of the fenonic model has been reached, thereby indicating that any insertion or substitution has been completed, the processing continues at processing block 815 where the present invention allows the fenonic model to shrink using the operation of deletion. The deletion algorithm is similar to the substitution and insertion algorithms.

The present invention begins the deletion process by initializing the current pair variable gh to the first two adjacent fenones in the fenonic model (processing block 815). The present invention then tests whether the end of the fenonic model has been reached (processing block 816). The end of the fenonic model has been reached when the adjacent pair of fenones at the end of the fenonic model have already been subject to the deletion process. If the results of the test indicate that the end of the fenonic model has been reached, then processing continues at processing block 827; otherwise, processing continues at processing block 817.

At processing block 817, the vectors aligned with the fenone pair gh are identified. Then the present invention computes the joint likelihood that these vectors could be produced by (1) the pair of fenones gh, (2) the single fenone g, (3) the single fenone h, or (4) any single fenone (processing block 818). The resulting log likelihoods of (1)–(4) are designed L1, L2, L3, and L4 respectively, where the fenone in (4) that maximizes the likelihood of the data is denoted f.

A test then determines if the likelihood L1 is greater than or equal to the maximum of L2, L3 or L4-T, where T is a predetermined threshold (processing block 819). Once again, the threshold T is equal to the number of samples multiplied by a threshold t, where threshold t may be a reasonable value depending on the accuracy of the recognition system. A reasonable value may be a number from 0-3. In one embodiment, the threshold T is the same as used during the substitution/insertion portion. This insures that fenones are not constantly deleted and then reinserted due to differing threshold levels being used in each operation.

If the likelihood L1 is greater than or equal to the maximum of L2, L3 or L4-T, then the fenones in the current fenone pair remain in the fenonic model unchanged (processing block 820) and processing continues at processing block 825. If the likelihood L1 is not greater than or equal to the maximum of L2, L3 or L4-T, then processing continues at processing block 821 where a test determines whether the likelihood L2 is greater than or equal to the maximum of either L3 or L4-T. If the likelihood L2 is greater than or equal to the maximum of either L3 or L4-T, then the fenone pair gh is replaced by the fenone g (processing block 828) and processing continues at processing block 825. On the other hand, if the likelihood L2 is not greater than or equal to the maximum of either L3 or L4-T, then processing continues at processing block 822 where a test determines if the likelihood L3 is greater than or equal to the likelihood of L4-T. If the likelihood L3 is greater than or equal to the likelihood of L4-T, then the fenone pair gh is replaced by fenone h (processing block 823); otherwise, the fenone pair gh is replaced by the fenone f (processing block 824). In either case, after their respective replacements, processing continues at processing block 825.

At processing block 825, the current fenone pair gh is set to the next pair in the fenonic model. In the present invention, the next pair includes the second fenone from the previous pair and the next adjacent fenone in the sequence of fenones in the fenonic model. Processing then continues at processing block 816 so that the deletion process may be repeated for the current pair of adjacent fenones.

If processing block 816 determines that the end of the fenonic model has been reached, such that the last adjacent pair of fenones in the fenonic model were the previous adjacent pair of fenones to undergo the deletion process, then processing continues at processing block 826. At processing block 826, a test determines whether any deletions occurred to the fenonic model during the last iteration of the deletion on each pair of fenones in the fenonic model. Such a determination may be accomplished by examining a flag or a predetermined number of bits (e.g., 1 bit) set in memory whenever a pair of fenones is replaced by a single fenone. If so, then processing continues at processing block 815 and the deletion process is repeated. The deletion process is repeated until there are no more deletions to the fenonic model.

Once deletions are no longer made to the current fenonic model, processing continues at processing block 826, where a test determines if any changes (i.e., substitutions, insertions or deletions) were made during the last iteration of the process. If changes were made, processing continues at processing block 803 where the entire process is repeated again. In this case, the fenonic model again undergoes the alignment operation and the operations of substitution, insertion and deletion are repeated again. If no changes were made, the process ends. Thus, the refinement process of the present invention is repeated until no more changes occur.

To reduce the dependency on the arbitrary transition probabilities chosen previously, the model obtained may be trained using the forward-backward algorithm, and the resulting fenonic transition probabilities substituted as the transition probabilities for the fenonic model. A new estimate of the fenonic model may then be constructed by repeating the steps and optionally repeating the training and construction processes iteratively.

To reduce computation, the search for the best fenone can be restricted to a subset of candidate fenones. For each vector v aligned with the arc or fenone being replaced, the fenone F(v) that maximizes the likelihood of vector v is determined. The fenone F(v) is then inserted into the candidate subset. The most likely fenone F(v) associated with any given vector v need only be computed once. This computation may occur ahead of time and stored. A more thorough search can be conducted, if desired, by inserting a predetermined number (>1) of the most likely fenones for each vector into the candidate list.

SPEECH RECOGNITION USING FENONIC MODELS

After the fenonic models are produced, they may be stored in the memory of a computer system for use in speech (or pattern) recognition. Such a system may be the computer system described in FIG. 3B. For instance, FIG. 9 shows an example memory unit, random access memory 312 of FIG. 3B. Memory 312 shows the storage of a set or array of Markov Models 921, a set or array of reference vectors 922, a set or array of updated reference vectors 923, a set or array of accumulation vectors 924, and a set or array of counters 925. Note that FIG. 9 is exemplary and is not intended to limit the scope of the present invention. For example, the set of updated reference vectors could alternatively be stored in a storage device 314, or the set of Markov Models could alternatively be stored in a storage device 314 or a read only memory 313.

Figure 10:
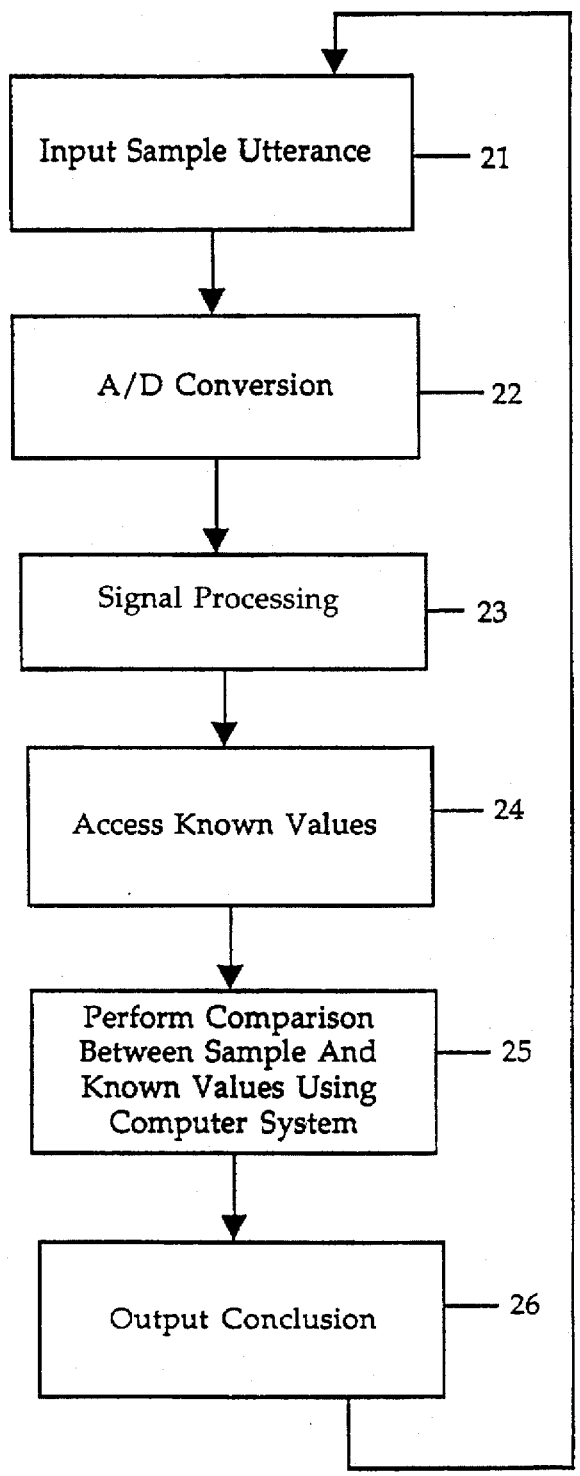
FIG. 10 is a flowchart of the general recognition method of the present invention as processed by a computer system.

FIG. 10 shows a flowchart of the general method used by a computer system of the present invention. Input utterance data is introduced to the computer system at step 21. The form of this input may vary, for example, the input may be voice data from a live speaker or a recorded voice. Upon receiving input, for example an utterance from an individual, the system transforms the analog voice data signals to digital form at step 22, which can be processed by the computer system of the present invention.

In step 23, the utterance (in digital form) is processed. A specialized signal processor is optional; for example, if the computer system contains signal processor 321 it may be employed to process the utterance, thereby alleviating the central processor 311 of the task. In systems where no signal processor exists, or one exists but is not utilized, the central processor 311 must perform the task. Regardless of which processor performs the task, the utterance (in digital form) is processed by being sliced in equal increments along the time dimension. Typically, the utterance is signal divided into 100 slices per second, thereby creating 100 slices of equal duration. However, the duration of a single slice may vary from system to system and the duration given above is exemplary and not intended to limit the scope of the present invention. Each slice is then converted into a vector, referred to as an observed vector, the creation of which is well known in the art. An observed vector, in one form, represents a summary of the utterance data for a given time slice. For instance, such a vector may consist of signal intensity or numerical energy data over a given set of frequency ranges. However, the types of observed vectors known to the art and their formats are great and any number will operate effectively within the scope and spirit of the present invention.

In step 24, the present invention directs the computer system to access known values which are stored in a memory unit 312 or other storage device of the system. These known values consist of a set of fenonic Markov Models (Models) and reference vectors, such as Gaussian means, both of which are well known in the art. One or more of the reference vectors is associated with each arc of each Markov Model.

At step 25 the present invention directs the computer system to compare the utterance, represented by the set of observed vectors, to the set of fenonic Markov Models. This comparison is done using any of a variety of procedures well known in the art, such as the Viterbi procedure, which determines the best path of an unknown utterance through the given set of Markov Models. The Viterbi procedure also associates the unknown vectors of the unknown utterance to particular arcs of the Markov Models. This information will be read by the present invention to associate a given observed vector to a set of reference vectors.

The adaptation process of the present invention occurs at step 25 also. The present invention updates the set of reference vectors corresponding to the identified Markov Model to more closely resemble the observed vectors. The adaptation process is described in co-pending application, filed on Sep. 30, 1993, Ser. No. 08/129,679 entitled "Continuous Reference Adaptation In A Pattern Recognition System", which is assigned to the assignee of the present invention.

The present invention utilizes the updated reference vectors when processing subsequent input utterances. That is, when the present invention is comparing a subsequent utterance to the set of Markov Models, the reference vectors corresponding to the Markov Models used by the comparison procedure, such as the Viterbi procedure, will be the updated reference vectors rather than the original reference vectors. Thus, the present invention will be able to better match subsequent utterances to the Markov Models.

The result of the comparison is output at step 26. This output is the single Model that is the closest match to the set of observed vectors. It should be noted that no guarantee exists that the resultant Model is the correct interpretation of the utterance. The resultant Model is the one Model in the set of Models with the highest probability of accuracy; however, the interpretation will be correct the overwhelming majority of the time.

The output step 26 encompasses a broad range of possibilities. For example, the system may output the data in visual form over the display device 315, in audio form over the speaker included in signal generation device 318, or storage format in storage device 314 or random access memory 312. Another potential output is the execution of a command, for example running an application program, opening or closing a particular data file, performing a maneuver in a running application such as a game, or shutting off the computer.

After outputting the results of the comparison at step 26, the present invention returns to step 21 and awaits further input.

It should be noted that the process for constructing fenonic HMMs, according to the present invention may be implemented in software for use on a computer system to allow applications developers to produce speech sensitive programs.

Thus, the present invention utilizes the alignment provided by the phonetic model of a speech event and the data driven approach to change the arcs in the phonetic model where it is appropriate to change them. Therefore, the present invention uses both the dictionary and the data driven approaches in combination.

More importantly, the present invention employs a continuous parameter acoustic vector and a mixture of Gaussian distributions to determine the match between a vector and a fenone, instead of using labels such as discrete parameter models in the prior art. In discrete parameter models, each label represents a region of acoustic space that is described using multinomial distributions. Knowing the label indicates the region in which the vector lies, but not whereabouts in the region it lies. This loss of precision is often referred to as quantization error. Thus, by using labels, the acoustic space is quantized into "chunks". The label-based models are characterized by multinomial distributions and quantization errors.

On the other hand, the present invention uses continuous parameter HMM (i.e., vector-based HMMs). The present invention uses continuous parameter fenones characterized by continuous distributions, such as Gaussian distributions. These Gaussian distributions do not suffer from the quantization errors that occur in conjunction with discrete parameter models. Applying the same rationale, the present invention uses continuous-valued acoustic vectors to represent utterances, not acoustic labels.

Furthermore, the present invention does not seek to maximize the joint probability of the utterances as commonly done in the prior art. This is because the unconstrained maximum often leads to poor models for recognition purposes.

Moreover, the present invention transforms phonetic models into fenonic models for greater consistency. In prior art speech recognition system, phonetic models are not used in this way. The greater consistency provided by the present invention is due to the reduced dependency on the dictionary, or knowledge-based, pronunciations, which may be incorrect and subject to human error, while increasing dependence on actual acoustic data.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for performing pattern recognition using fenonic hidden Markov models has been described.

We claim:

1. A method of constructing a hidden Markov model of a given speech event comprising the steps of:
   providing a sequence of phonetic models representing the given speech event;
   creating a plurality of fenones associated with acoustic vectors, wherein each of the plurality of fenones is a hidden Markov model representing an acoustic event; and
   creating a fenonic model for said given speech event, wherein each of the sequence of phonetic models is replaced by at least one of the plurality of fenones, such that the fenonic model comprises a sequence of fenones.

2. The method defined in claim 1 wherein the step of creating of plurality of fenones includes characterizing each of the plurality of fenones by a duration and a set of acoustic properties.

3. The method defined in claim 2 wherein the duration is characterized using a set of transition probabilities.

4. The method defined in claim 2 wherein the set of acoustic properties includes a set of multivariate Gaussian distributions.

5. The method defined in claim 4 wherein each of the set of multivariate Gaussian distributions includes a centroid and a covariance matrix.

6. The method defined in claim 1 further comprising the step of modifying the fenonic model.

7. The method defined in claim 6 wherein the step of modifying the fenonic model comprises inserting a fenone into the fenonic model.

8. The method defined in claim 6 wherein the step of modifying the fenonic model comprises deleting a fenone from the fenonic model.

9. A method for constructing a hidden Markov model for a speech event that is represented by a phonetic sequence, said method comprising the steps of:

creating a plurality of fenones in a one-to-one correspondence with each of a plurality of distinct phonetic arcs in a phonetic model, wherein plurality of fenones are associated with acoustic vectors; and creating a fenonic model for a given speech event, wherein the step of creating a fenonic model includes the steps of selecting a predetermined number of instances of said given speech event; and replacing each arc in the phonetic sequence by one of the plurality of fenones to create a sequence of fenones, wherein said one of the plurality of fenones is selected so as to maximize the joint likelihood of all vectors aligned with the arc in the predetermined number of samples, such that the fenonic model for the given speech event is produced.

10. The method defined in claim 6 further comprising the step of realigning the predetermined number of samples with the fenonic model.

11. The method defined in claim 6 wherein the step of creating a plurality of fenones includes the steps of:

clustering acoustic vectors from training data aligned with each arc in the phonetic model, wherein acoustic vectors are clustered into a predetermined number of clusters; and generating the centroid and covariance matrix for each of said predetermined number of clusters.

12. The method defined in claim 15 wherein the step of clustering is performed by k-means clustering.

13. The method defined in claim 15 wherein the step of creating a plurality of fenones further includes specifying the duration of each of the plurality of fenones.

14. The method defined in claim 17 wherein the duration is specified by assigning a set of transition probabilities to each of the plurality of fenones, wherein one of each of the set is assigned to each arc in one of the plurality of fenones.

15. A method for constructing a hidden Markov model for a speech event that is represented by a phonetic sequence, said method comprising the steps of:

creating a plurality of fenones in a one-to-one correspondence with each of a plurality of distinct phonetic arcs; and creating a fenonic model for a given speech event, wherein the step of creating a fenonic model includes the steps of selecting a predetermined number of instances of said given speech event; and replacing each arc in the phonetic sequence by one of the plurality of fenones to create a sequence of fenones, wherein said one of the plurality of fenones is selected so as to maximize the joint likelihood of all vectors aligned with the arc in the predetermined number of samples, such that the fenonic model with the sequence of fenones for the given speech event is produced;

modifying the fenonic model.

16. The method defined in claim 15 wherein the step of modifying includes substituting at least one of the plurality of fenones for a fenone in the sequence of fenones in the fenonic model.

17. The method defined in claim 16 wherein said at least one of the plurality of fenones is substituted for said fenone if the joint likelihood of said at least one of the plurality of fenones less a predetermined threshold is greater than the joint likelihood of said fenone in the sequence of fenones for which said at least one of the plurality of fenones is substituted.

18. The method defined in claim 16 wherein said fenone is replaced by a pair of fenones where at least one of said pair of fenones comprises said fenone.

19. The method defined in claim 15 wherein the step of modifying includes inserting a fenone into the sequence of fenones in the fenonic model.

20. The method defined in claim 15 wherein the step of modifying includes deleting a fenone in the sequence of fenones in the fenonic model.

21. The method defined in claim 20 wherein said fenone is deleted from the sequence of fenones when the joint likelihood of a pair of fenones that comprises said fenone and a following and immediately adjacent fenone in said sequence less a predetermined threshold is greater than the joint likelihood of said fenone.

22. A method for constructing a Markov model comprising the steps of:

recording training data;

processing the training data into a sequence of acoustic vectors;

aligning the sequence of vectors with linear phonetic Markov models;

creating a first alphabet of distinct phonetic arcs in the training data;

for each arc in the first alphabet, extracting the acoustic vectors aligned with said each arc in the first alphabet;

clustering the acoustic vectors aligned with said each arc to create a predetermined number of clusters;

computing centroid and covariances matrices for each of said predetermined number of clusters;

defining a second alphabet of a plurality of fenones, wherein the plurality of fenones are associated with acoustic vectors and each of the plurality of fenones is represented by an elementary HMM and is associated with a plurality of Gaussian distributions and a set of transition probabilities; and replacing each distinct arc in the phonetic sequence with one of the plurality of fenones, such that a fenonic model for the speech event is created.

23. The method defined in claim 19 wherein the step of aligning includes obtaining a Viterbi alignment.

24. A Markov model for a speech event created according to a method comprising the steps of:

providing a sequence of phonetic models representing the given speech event;

creating a plurality of fenones, wherein each of the plurality of fenones is a hidden Markov model representing an acoustic event; and creating a fenonic model for said given speech event, wherein each of the sequence of phonetic models is replaced by at least one of the plurality of fenones, such that the fenonic model includes a sequence of fenones from the plurality of fenones; and modifying the fenonic model.

25. The method defined in claim 24 wherein the step of modifying the fenonic model comprises inserting a fenone into the fenonic model.

26. The method defined in claim 24 wherein the step of modifying the fenonic model comprises deleting a fenone from the fenonic model.

27. An apparatus for constructing a hidden Markov model of a given speech event comprising the steps of:

means for providing a sequence of phonetic models representing the given speech event;

means for creating a plurality of fenones associated with acoustic vectors, wherein each of the plurality of fenones is a hidden Markov model representing an acoustic event;

means for creating a fenonic model for said given speech event, wherein each of the sequence of phonetic models is replaced by at least one of the plurality of fenones, such that the fenonic model comprises a sequence of fenones; and means for modifying the fenonic model.

28. A speech processing apparatus comprising:

a speech input device;

an acoustic processor that produces a plurality of acoustic vectors in response to speech received by the speech input device;

an alignment mechanism that aligns the plurality of acoustic vectors with phonetic Markov models; and a fenonic processor that constructs fenonic Hidden Markov Models (HMMs), wherein the fenonic processor creates a plurality of fenones associated with the plurality of acoustic vectors, where each of the plurality of fenones is a hidden Markov model representing an acoustic event, and creates a fenonic model for a given speech event by replacing each of a sequence of phonetic models representing the given speech event with at least one of the plurality of fenones, thereby creating the fenonic model as a sequence of fenones.

29. The apparatus defined in claim 28 wherein the fenonic processor modifies the fenonic model.

30. The apparatus defined in claim 28 wherein the fenonic processor modifies the fenonic model by inserting a fenone into the fenonic model.

31. The apparatus defined in claim 28 wherein the fenonic processor modifies the fenonic model by deleting a fenone from the fenonic model.

* * * * *